US012387883B2

(12) United States Patent
Arx et al.

(10) Patent No.: US 12,387,883 B2
(45) Date of Patent: Aug. 12, 2025

(54) SYSTEM AND METHOD OF DETECTING A WELDED CONTACT

(71) Applicant: Rockwell Automation Switzerland GmbH, Aarau (CH)

(72) Inventors: Rahel Von Arx, Aarau (CH); David Urech, Aarau (CH); Pascal Stoll, Aarau (CH); Markus Gloor, Aarau (CH)

(73) Assignee: Rockwell Automation Switzerland GmbH, Aarau (CH)

( * ) Notice: Subject to any disclaimer, the term of this patent is extended or adjusted under 35 U.S.C. 154(b) by 894 days.

(21) Appl. No.: 17/397,600

(22) Filed: Aug. 9, 2021

(65) Prior Publication Data

US 2023/0044944 A1 Feb. 9, 2023

(51) Int. Cl.

| | |
|---|---|
| ***H01H 9/24*** | (2006.01) |
| ***H01H 9/16*** | (2006.01) |
| ***H01H 9/28*** | (2006.01) |

(52) U.S. Cl.

CPC ................ *H01H 9/28* (2013.01); *H01H 9/16* (2013.01); *H01H 9/24* (2013.01); *H01H 2009/288* (2013.01)

(58) Field of Classification Search

None

See application file for complete search history.

(56) References Cited

U.S. PATENT DOCUMENTS

| | | | | |
|---|---|---|---|---|
| 5,929,405 A * | 7/1999 | Wehrli, III | ............... | H01H 9/24 200/50.01 |
| 9,685,283 B2 * | 6/2017 | Darko | .................. | H01H 33/121 |

FOREIGN PATENT DOCUMENTS

| | | |
|---|---|---|
| DE | 10152425 A1 | 5/2022 |
| EP | 2023368 A1 | 2/2009 |

OTHER PUBLICATIONS

Extended European Search Report dated Feb. 8, 2023; Application No. 22188279.8—(9) pages.

* cited by examiner

*Primary Examiner* — Felix O Figueroa

(74) *Attorney, Agent, or Firm* — Boyle Fredrickson, S.C.

(57) ABSTRACT

An industrial switching device prevents a false indication of an open electrical circuit when contacts within the switching device are welded shut. Under normal operation, an actuator is selectively moved between a first position and a second position to reciprocally move a plunger to open and close the contacts. The actuator includes an indicator of whether the switching device is in the “ON” or “OFF” state. When the contacts are welded shut, a plunger engagement section interlocks with an actuator engagement section to prevent the actuator from moving from the “ON” position to the “OFF” position. A crossbar on the plunger engagement section embeds in the actuator engagement section to prevent the actuator from sliding over the plunger. A side member on the plunger engagement section prevents the actuator from sliding around the plunger.

8 Claims, 16 Drawing Sheets

SYSTEM AND METHOD OF DETECTING A WELDED CONTACT

BACKGROUND INFORMATION

The subject matter disclosed herein relates to switching devices for industrial equipment. More specifically, an aspect of the invention relates to switching devices that include a mechanism and method of preventing undesired movement of the actuator indicating that the electrical connection of the switching device is open when the electrical connection is still closed.

As is known to those skilled in the art, switching devices are components in an electrical circuit that may be controlled between an "ON" and an "OFF" state. In the ON state, the switching device establishes an electrical connection between contacts and allows electrical current to flow through the switching device from a power source to an electrical load. In the OFF state, the switching device opens, or breaks, the electrical connection between contacts, preventing the electrical current from flowing through the switching device. Switching devices may be used, for example, as a circuit breaker, motor protection device, contactor to supply power to one or more branch circuits, or the like. The switching device may be manually or automatically actuated. A mechanical switch or electronic actuator is provided which moves between two states. In one state, the mechanical switch or electronic actuator causes the switching device to establish the electrical connection, and, in the other state, the mechanical switch or electronic actuator causes the switching device to break the electrical connection. The mechanical switch may be actuated by rotating a handle of a rotary disk, which causes a plunger to move a switching element within the switching device in a first direction as the switch or actuator transition from a first state to a second state. When the mechanical switch or electrical actuator, transition back from the second state to the first state, a spring causes the switching element to return to its original position.

However, these switching devices are not without certain challenges. In certain failure modes, the potential exists for the contacts to be welded together. For example, a short circuit in a motor either between windings or to ground due to a failure in the insulation within the motor may result in a significant amount of current drawn thorough the motor. While the branch circuit to the motor includes a circuit breaker configured to trip upon detection of such an inrush of current, the amplitude of current through the contacts of the electrical switch device may be high enough for a short duration to weld the contacts together. When the contacts are welded together, the plunger is unable to move. The switching device therefore remains in the first state, where the electrical connection remains established and cannot be broken.

Additionally, the potential further exists for the switch to appear in an OFF state, indicating the electrical connection is open, even when it is not. The actuator may include, or the handle of the actuator may serve as, an indicator pointing to indicia on the switch identifying whether the switch is ON or OFF. A technician may turn the actuator from an ON state to an OFF state in advance of maintenance on the industrial equipment connected to the switch. When the technician rotates the actuator, "slippage" occurs within the switch, allowing components within the switch to slide over one another such that the actuator appears to be in the OFF state even when the contacts are welded together. As a result, the orientation of the actuator does not indicate the true state of the electrical connection. The actuator appears to indicate the electrical connection switch is OFF when it is not, creating a dangerous situation.

While attempts have been made to solve such an issue, such attempts have not fully solved the issue without incurring various certain disadvantages. Thus, it would be desirable to provide a new mechanism that does not allow the actuator to "slip" and incorrectly indicate that the switch is in an OFF state. Further, it would be advantageous if the new mechanism was relatively easy and inexpensive to implement.

BRIEF DESCRIPTION

According to one embodiment of the invention, a switching device for industrial equipment, having at least one pair of contacts, includes an actuator and a plunger. The actuator has an actuator engagement section, and the actuator is selectively moved between a first position and a second position. The plunger has an engagement area and a crossbar. When the at least one pair of contacts are not welded together, the actuator selectively moves the plunger as the actuator is moved between the first position and the second position. When the at least one pair of contacts are welded together, the actuator engagement section engages the crossbar thereby preventing the actuator from moving between the first state and the second state.

According to another embodiment of the invention, a method of detecting contacts welded together in an industrial switching device is disclosed. An actuator of a switching device for industrial equipment is attempted to be rotated from an "ON" state towards an "OFF" state. An actuator engagement section of the actuator engages with a plunger engagement section of a plunger while attempting to rotate the actuator when the contacts are welded together, and the actuator selectively moves the plunger between a first position and a second position when the contacts are not welded together. The actuator is prevented from rotating from the "ON" state to the "OFF" state as a result of engaging the actuator engagement section with the plunger engagement section when the contacts are welded together, and the contacts are detected as being welded together as a result of preventing the actuator from rotating.

According to still another embodiment of the invention, a switching device for industrial equipment, having at least one pair of contacts, includes a plunger having an engagement area. The engagement area includes a long member extending across a direction of rotation of an actuator for the switching device and a short member extending tangential to a direction of rotation. The long member is configured to prevent rotation of the actuator when the at least one pair of contacts are welded together, and the short member is configured to prevent the actuator from moving laterally around the plunger. The engagement area includes a crossbar configured to engage an actuator engagement section of the actuator to prevent the actuator from moving over the plunger.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
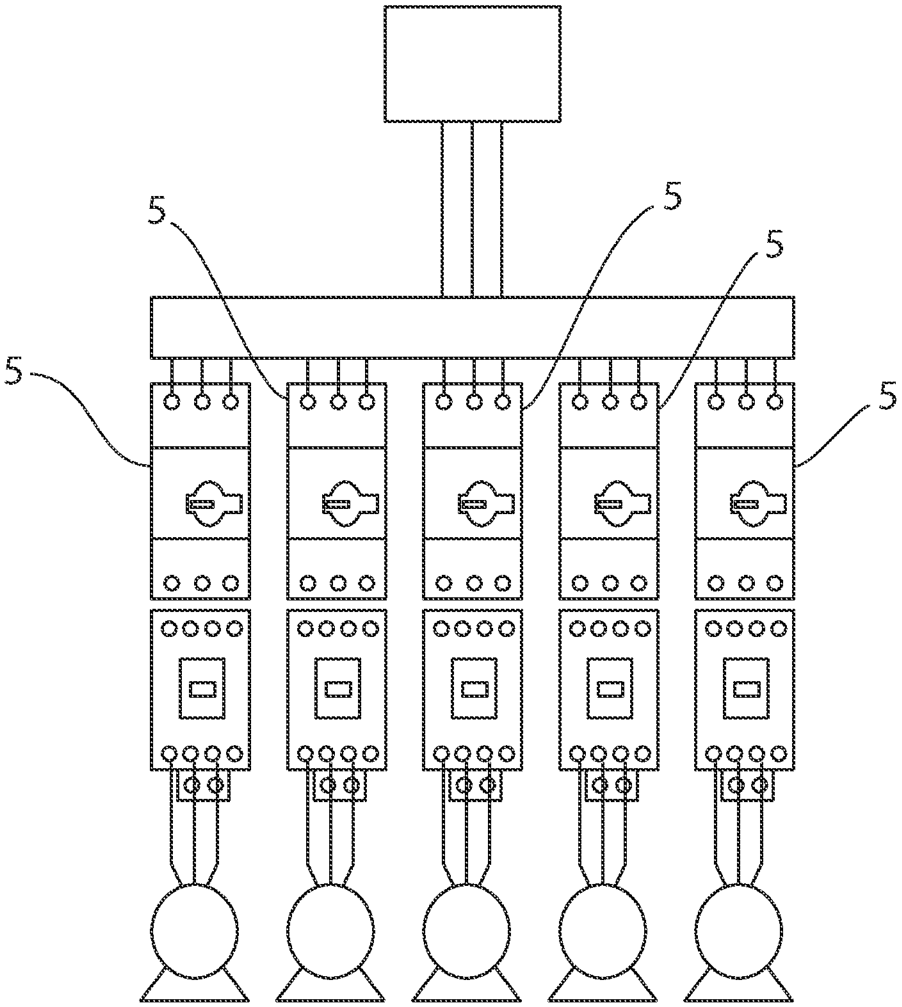
FIG. 1 is a schematic diagram of a series of electrical switches connected to a fuse.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system of preventing electrical switch devices for industrial equipment from providing an indication that the switch is in an OFF state when it is not. Switching devices may include an actuator which, when actuated, allows the switching device to alternate between a first state, where there is an electrical connection, and a second state, where the electrical connection is broken. The switching device alternates between the two states by selectively closing or opening contacts within the switching device. The switching device includes an actuator with an actuator engagement section. The switching device further includes a plunger with a plunger engagement section. The plunger engagement section has an engagement area. At least a portion of the actuator engagement section is selectively rotatable toward the engagement area of the plunger. When the contacts are not welded, rotation of the actuator causes the plunger to move into the switching device and away from the actuator allowing the actuator engagement section to pass by the plunger engagement section. When the contacts are welded, the welded contacts prevent the plunger from moving into the switching device during rotation of the actuator and the actuator engagement section engages the plunger engagement section. The plunger engagement section is configured to stop both rotation of the actuator and lateral motion of the actuator to prevent the actuator from slipping besides the plunger.

In another embodiment of the invention, the invention may further include a switching device that has an actuator with an actuator sidewall. The switching device further includes a plunger with a plunger engagement section. The plunger engagement section further has a crossbar. The actuator sidewall is formed from a first material and the crossbar is formed from a second material. The first material is softer than the second material. When the contacts are welded and the actuator is rotated, the actuator sidewall and crossbar interlock. The crossbar engaging with the actuator sidewall is configured to prevent the actuator from slipping over the plunger.

The novel switching device therefore prevents the actuator from slipping besides or over the plunger when the contacts are welded and falsely indicating that the electrical connection has been broken.

Figure 2:
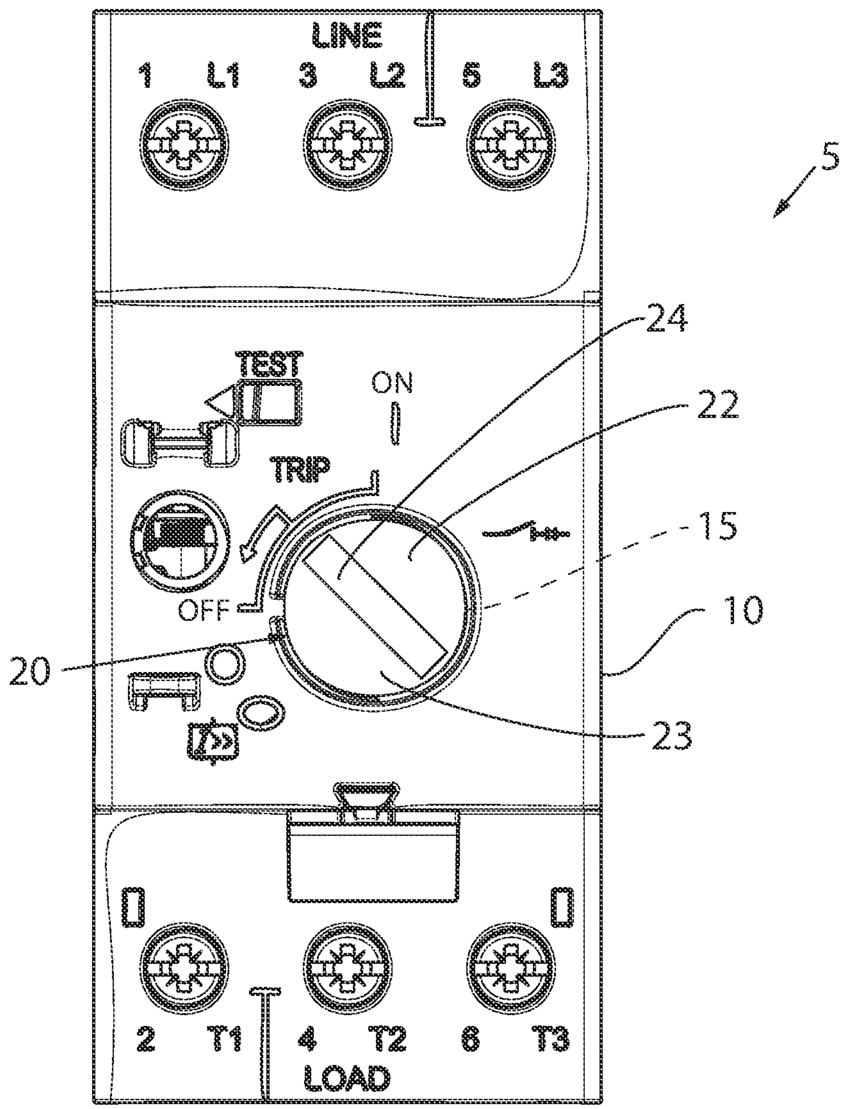
FIG. 2 is a front elevation view of one of the electrical switches of FIG. 1.

Turning initially to FIG. 1, electrical switches 5 may be mounted in a cabinet and used to control industrial equipment. Group installation allows multiple motors or loads to be connected to a single branch circuit protection device. A separate electrical switch 5 is mounted between the branch circuit protection device and each motor or load. As illustrated in FIG. 2, an electrical switch 5 includes a housing 10 with a housing aperture 15. The electric switch 5 includes an actuator 20, that extends through the housing aperture 15, and a switching device 25 (shown in FIG. 4) that may be incorporated into the electric switch 5. The electric switch 5 may be a circuit breaker, a motor protection circuit, an electrical contactor, or the like. The switching device 25 includes a plunger 30 configured to move reciprocally, back-and-forth, along an axis 35. A first end 32 of the plunger 30 is configured to engage the actuator 20 in the electrical switch 5. It is contemplated that the plunger 30 may directly engage the actuator 20 or include one or more intermediate members within the switch 5 to cause the reciprocal motion as the actuator 20 moves between two positions. The actuator 20 may be manually activated by, for example, a toggle switch or a handle 24 on a rotary switch 22 (see e.g., FIG. 2). Optionally, the actuator 20 may be automatically activated, for example, by a solenoid energized by a relay. Regardless of manual or automatic actuation, the plunger 30 is configured to move between a first position and a second position. The second end of the plunger 30 (not shown) is configured to be inserted into a plunger seat (not shown). The plunger seat may have a lower surface against which the second end of the plunger 30 rests. Optionally, the plunger seat may have an open end and the plunger seat is configured to align the plunger 30 with the switching element 25. The second end of the plunger 30 may then rest against the switching element 45. The plunger 30 applies a force to the switching element 45 when the actuator 20 drives the plunger 30 from the first position to the second position either directly, if the second end of the plunger 20 rests on the switching element 45, or indirectly via the plunger seat if the plunger seat includes a lower surface. The illustrated plunger 30 is intended to be exemplary only. It is illustrated as a unitary cylindrical member being driven reciprocally along the axis of the piston. However, it is contemplated that multiple plungers 30 may be mechanically connected or formed as a single member such that multiple switching elements 45 within a switching device 25 may be selectively opened or closed in tandem. According to one aspect of the invention, it is contemplated that the switching device 25 may include three plungers 30 each driven in tandem to selectively open or close a three phase electrical connection. It is further contemplated that a single plunger 70 may include multiple arms 170, each configured to engage a separate switching element within the switch (see e.g., FIG. 9). It is further contemplated that the geometry of the plunger 30 may take other forms, such as a square or rectangular sectional area. It is also contemplated that the plunger 30 may include an offset segment along the length of the plunger such that a force is applied at a first end of the plunger 30 along a first axis and the second end of the plunger 30 moves reciprocally along a second axis where the second axis is parallel to but offset from the first axis. The offset segment may, for example, run generally orthogonal between two additional members, where the first additional member extends generally along the first axis and the second additional member extends generally along the second axis.

Terms such as upper, lower, inner, outer, front, rear, left, right, and the like will be used herein with respect to the illustrated switching device 25. These terms are relational with respect to the illustrated switching device and are not intended to be limiting. It is understood that the switching device 25 may be installed in different orientations, such as vertical or horizontal, or may be rotated one hundred eighty degrees without deviating from the scope of the invention.

Figure 4:
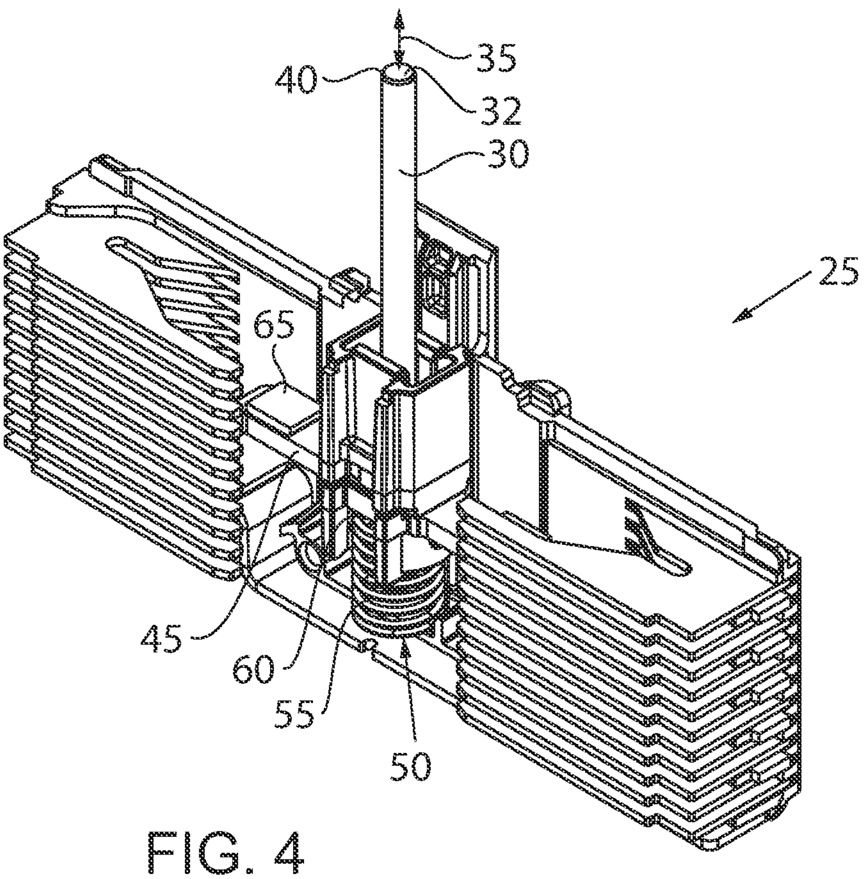
FIG. 4 is a partial perspective view of a switching device.
Figure 5:
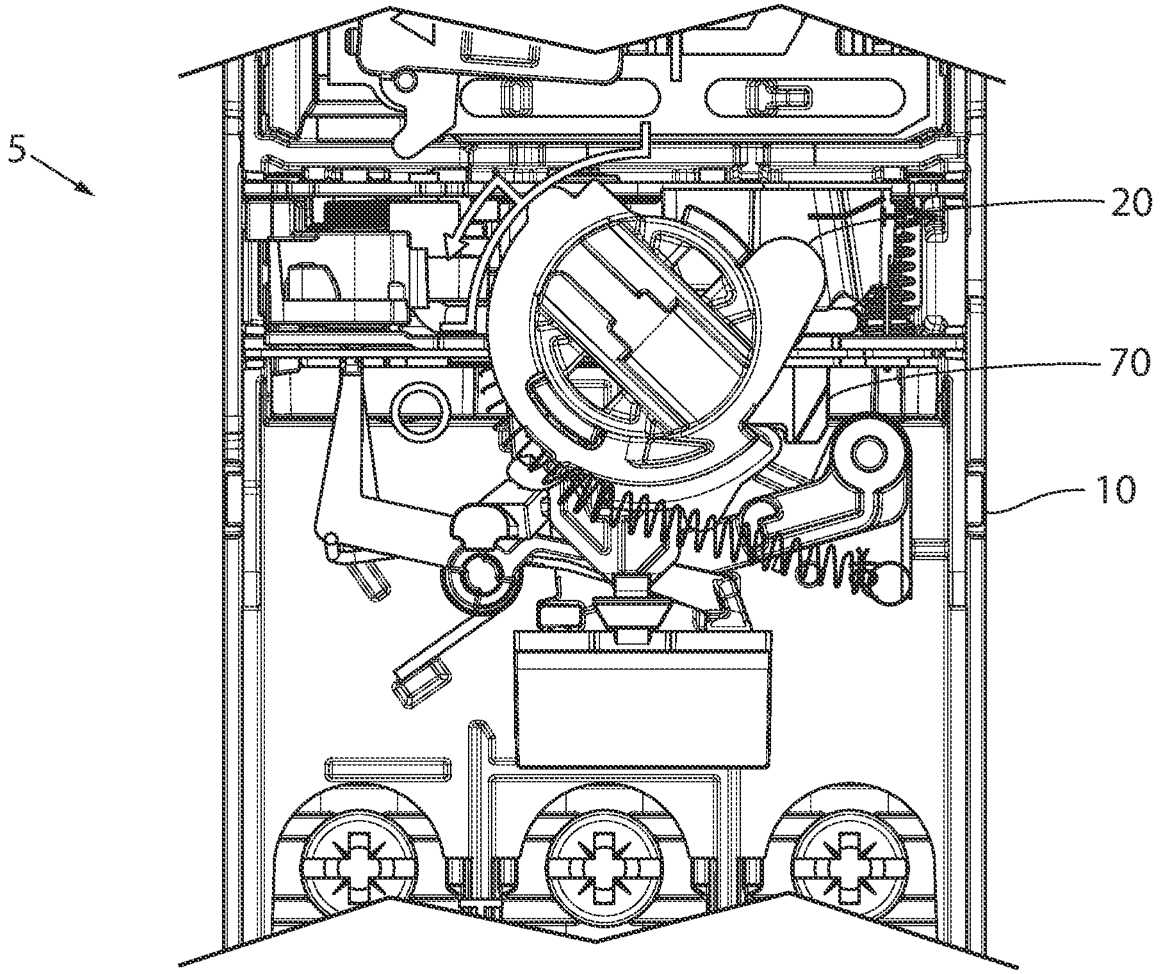
FIG. 5 is a partial front elevation view of the electrical switch of FIGS. 1-3.

With reference also to FIG. 4, the switching device 25 includes a spring 50 which applies a force in a direction opposing actuation of the plunger 30. The spring 50 has a first end which is seated against a lower housing of the switching device 25 and a second end which is seated, at least in part, against a lower surface 31 of the switching element 45. When the plunger 30 is in the first position, the spring 50 may be partially compressed such that it applies a sufficient force against the switching element 45 to stay in the first position. As the actuator drives the plunger 30 from the first position to the second position, the spring 50 becomes more compressed, applying a greater force against the switching element 45. When the actuator 20 releases the plunger 30, the spring 50 causes the switching element 45 to return to and stay in the first position. If multiple switching elements 45 exist within a switch, each switching element 45 may have a spring associated with the element to exert a force on the plunger. According to still another embodiment, a plunger 70 may be configured to engage multiple switching elements 45 in tandem and the plunger 70 may have a spring seat 159 against which a single spring may be positioned, applying a biasing force directly against the plunger 70 rather than against one or more switching elements 45.

The switching element 45 is an assembly that includes at least one contact 65 mounted on the switching element 45. The contact 65 is configured to engage a complementary contact 67 in the first position and to disengage from the complementary contact 67 as the switching element 45 is moved from the first position to the second position. According to the illustrated embodiment, the switching element 45 includes a pair of contacts 65, where one contact is mounted to the switching element on one side of the plunger 30 when the plunger engages the switching element and the other contact is mounted on the other side of the plunger 30.

Figure 3:
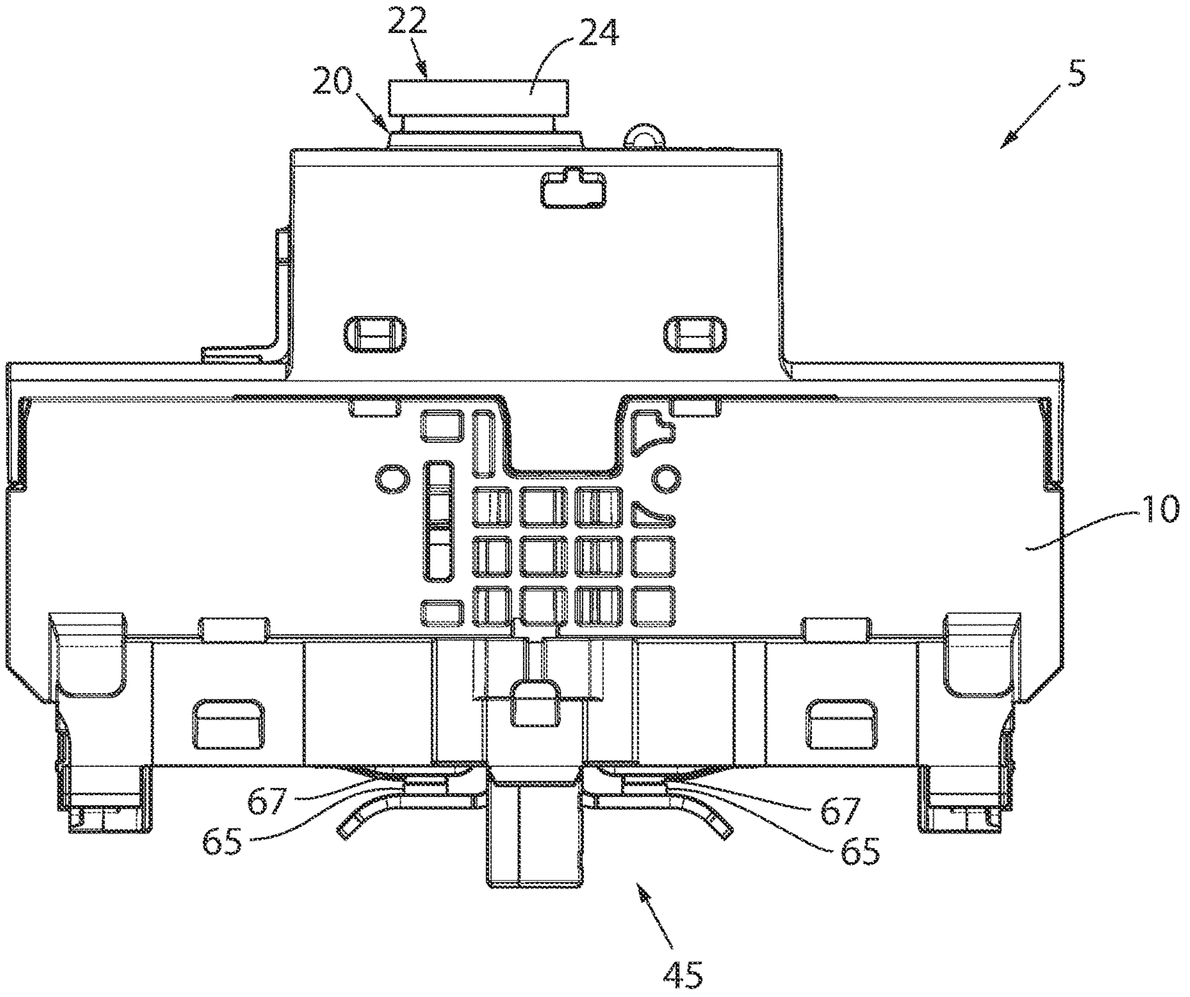
FIG. 3 is a side elevation view of the electrical switch of FIGS. 1 and 2 with a lower housing removed.

With reference again to FIGS. 2-4 and stated previously, the electric switch 5 has an actuator 20 which engages and drives the plunger 30 from a first to second position thereby causing the switching device 5 to establish the electrical connection in a first state through connection between the movable contacts 65 and the fixed contacts 67 or to break the electrical connection between the contacts 65, 67 in a second state. The movable contacts 65, however, may become welded to the fixed contacts 67 when the switch 5 is overloaded or experiences a brief, very high current due, for example, to a short circuit in the load connected to the switch. When the movable contacts 65 are welded to the fixed contacts 67, the force applied from the actuator 20 is insufficient to separate the contacts. Further, if the actuator 20 were able to rotate despite the welded contacts, the handle 24 of the actuator could indicate that the switch is in a second state (i.e., the electrical connection has been broken) even when the welded contacts maintain the electrical connection. The switching element 45 is illustrated in FIG. 3 in the first state with the movable contacts 65 on the switching device engaging the fixed contacts 67 on the upper portion of the switch 5. In this position, an electrical connection is established, allowing current to flow through the switch 5.

In one embodiment, the actuator 20 may be a rotary disk. Prior actuators had the potential for “slipping” when actuated. In other words, when the prior actuator was actuated through rotation, the prior actuator had the potential to slip over or besides a plunger so that the actuator indicated the switching device 25 had moved to the second state, or OFF condition. However, if the movable contacts 65 on the switching device 25 and the complementary contacts 67 were welded, the electrical connection remained established and only appeared, via the orientation of the actuator, to have been broken.

Figure 6:
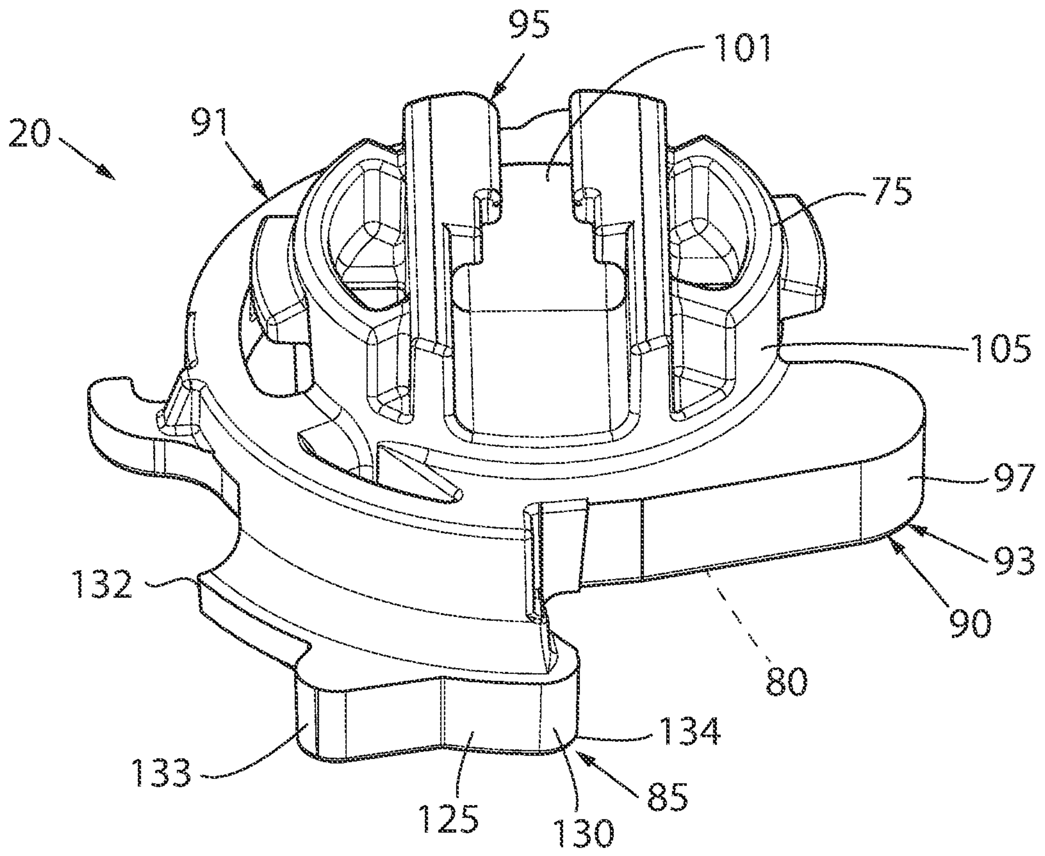
FIG. 6 is a perspective view of one embodiment of an actuator.
Figure 7:
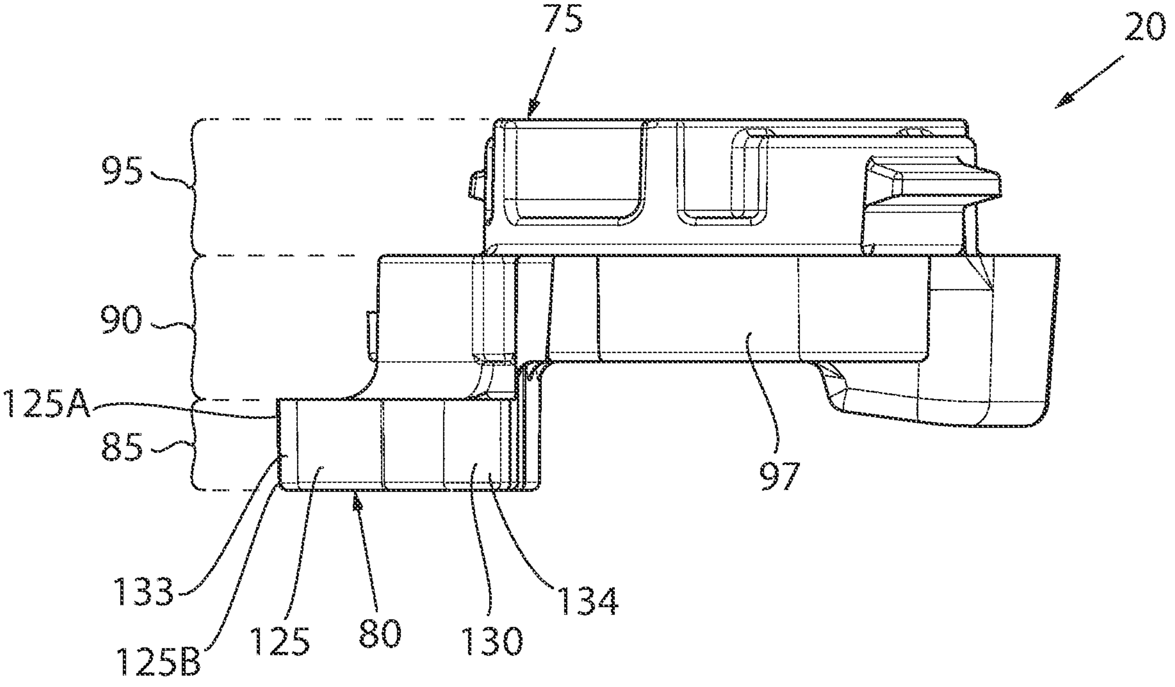
FIG. 7 is a side elevation view of the actuator of FIG. 6.

With reference to FIGS. 6-7, one embodiment of the invention includes an actuator 20 configured for rotational motion. In the illustrated embodiment, the actuator 20 may include a first actuator face 75 and a second actuator face 80, located and positioned opposite from the first actuator face 75. The actuator 20 further includes three segments defined between the second actuator face 80 and the first actuator face 75. As best illustrated in FIG. 7, a first segment defines an actuator engagement section 85 located and positioned proximate the second actuator face 80 and extending for a first distance from the second actuator face 80 toward the first actuator face 75. A second segment defines an actuator shoulder section 90 beginning at the actuator engagement section 85 and extending away from the actuator engagement section 85 and towards the first actuator face 75 for a second distance. The third segment defines an actuator handle section 95 beginning at the actuator shoulder section 90 and further projecting away from the actuator shoulder section 90 for a third distance to the first actuator face 75.

The actuator engagement section 85 extends below and along one side of the actuator 20. A lower surface of the actuator engagement section 85 generally defines the second actuator face 80. The actuator engagement section 85 includes an actuator engagement sidewall 125 extending generally orthogonally away from the second actuator face 80 for at least a portion of the first distance. According to the illustrated embodiment, the actuator engagement sidewall 125 has a rounded edge joining the second actuator face 80 and extends the rest of the first distance to the actuator shoulder section 90. The outer periphery has a generally arcuate shape extending between a first end 132 and a second end 134 of the actuator engagement section 85 with a protrusion 133 extending axially outward from the actuator engagement sidewall part way between the first and second ends. An actuator engagement surface 130 is located proximate the second end 134 of the actuator engagement section 85 and is generally "U"-shaped. The inner periphery of the actuator engagement section 85 is a generally planar surface returning from the second end 134 to the first end 132 of the actuator engagement section below the actuator shoulder section 90.

The actuator shoulder section 90 defines a middle portion of the actuator 20 and is configured to slidably engage other components within the switch 5 as the actuator 20 is rotated between a first position and a second position. The actuator shoulder section 90 has an irregular geometric outer periphery with a first portion 91 of the outer periphery being generally semicircular and a second portion 93 of the outer periphery including a cam 97 extending therefrom. The cam 97 is configured to engage either a first gear tooth 141 or a second gear tooth 143 (see FIG. 11) to cause the reciprocal motion of the plungers in the switching element 45. When the actuator 20 is rotated in a counter-clockwise motion, the cam 97 engages the first gear tooth 141, rotating the internal actuator 147 from a first position to a second position. When the actuator 20 is rotated in a clockwise motion, the cam 97 engages the second gear tooth 143, rotating the internal actuator 147 from the second position back to the first position. The internal actuator 147 includes a second cam which, in turn, engages a plate 149, coupled between the internal actuator 147 and the plunger 70, to create linear motion of the plate 149. The linear motion of the plate 149 is reciprocal away from and returning toward the actuator 20. Because the plunger 70 is coupled to the plate 149, the plunger 70 similarly moves in a reciprocal motion away from and returning toward the actuator 20 as the actuator 20 is rotated between the first and second positions.

The actuator handle section 95 is positioned at the front most surface of the actuator 20. The actuator handle section 95 may be shaped and sized so that the actuator handle section 95 extends through the housing aperture 15 of the switch 5 and is configured to receive a handle 22 within the channel 101 on the front of the actuator 20. The actuator handle 22 may further include a generally circular actuator handle face 23 (see also FIG. 2) and a generally rectangular grip 24 extending perpendicular to the actuator handle face. The grip 24 is shaped and sized so that a user may grasp the grip to rotate the actuator 20. In one aspect of the invention, the grip 24 may additionally provide an indication of whether the switch 5 is in the first state or the second state by "pointing" to "on" and "off" labels on the housing 10 of the switch 5.

In an aspect of the invention, at least the actuator engagement surface 130 of the actuator 20 may be formed from a first material. The first material may be nylon, polyoxymethylene (POM), polybutylene terephthalate (PBT), or any combination of such material. The first material is preferably not reinforced with glass fiber or is reinforced with a low amount of glass fiber, or any other suitable material which is a softer material than the material forming at least a portion of the plunger 70, as will be described hereinafter. Typically, the entire actuator 20 will be formed as a single element and made from a common material.

Figure 8:
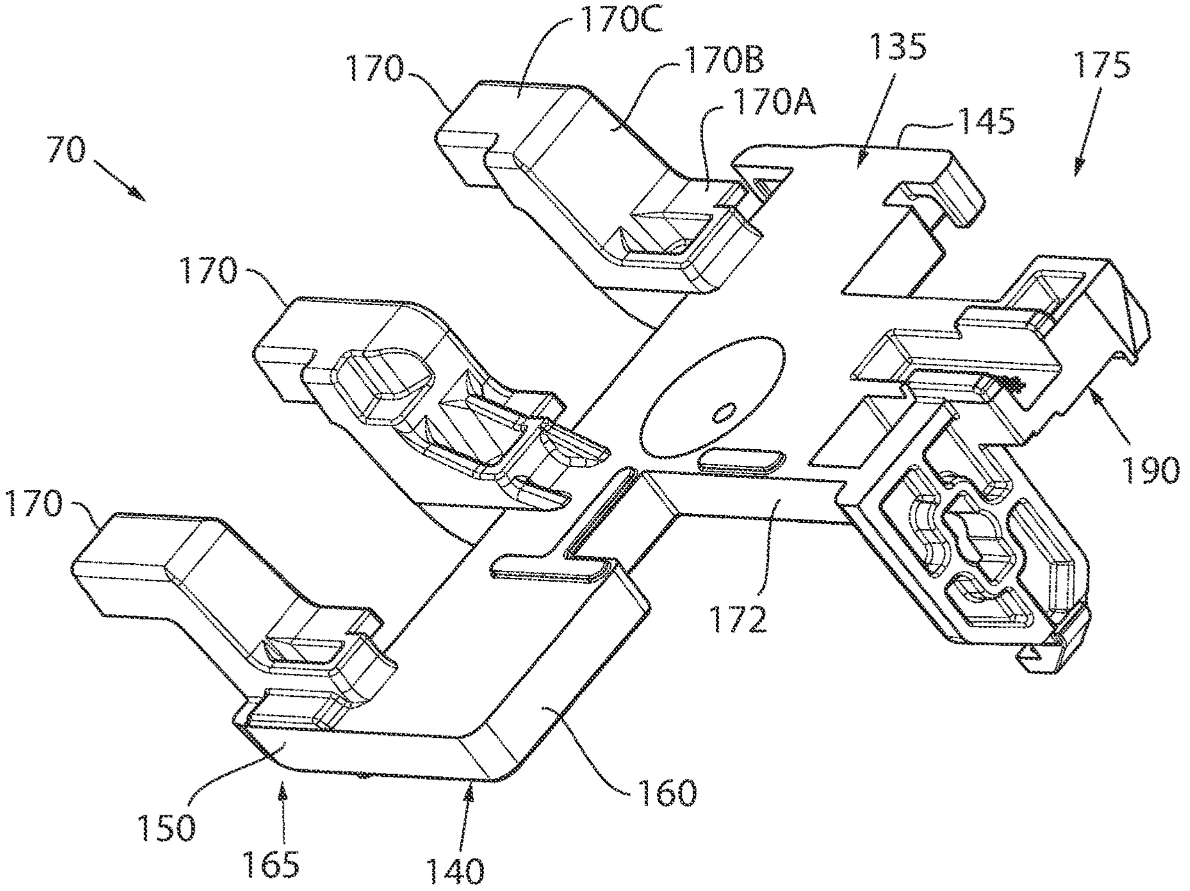
FIG. 8 is a perspective view of one embodiment of a plunger.
Figure 9:
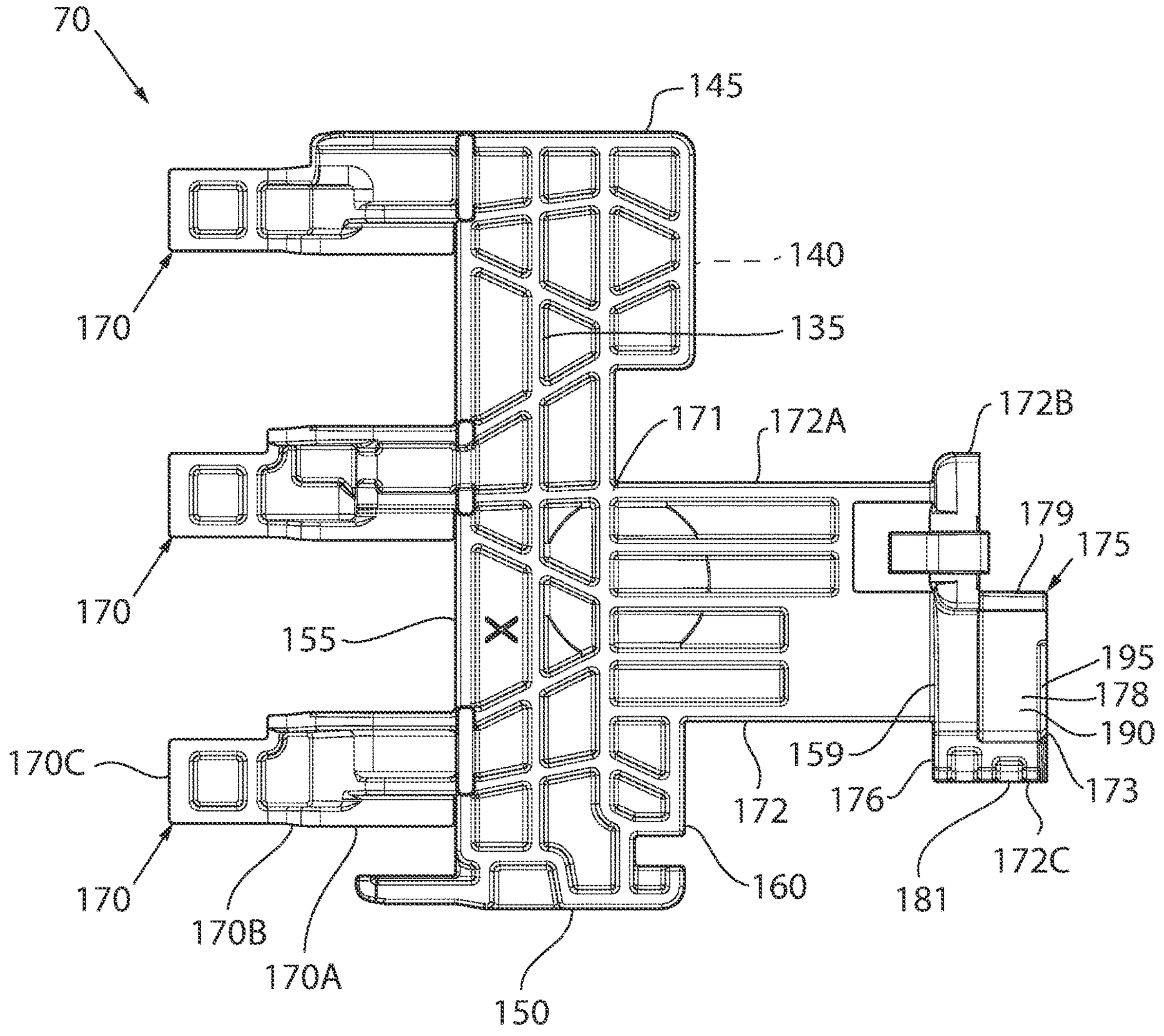
FIG. 9 is an elevation view of the plunger of FIG. 8.
Figure 10:
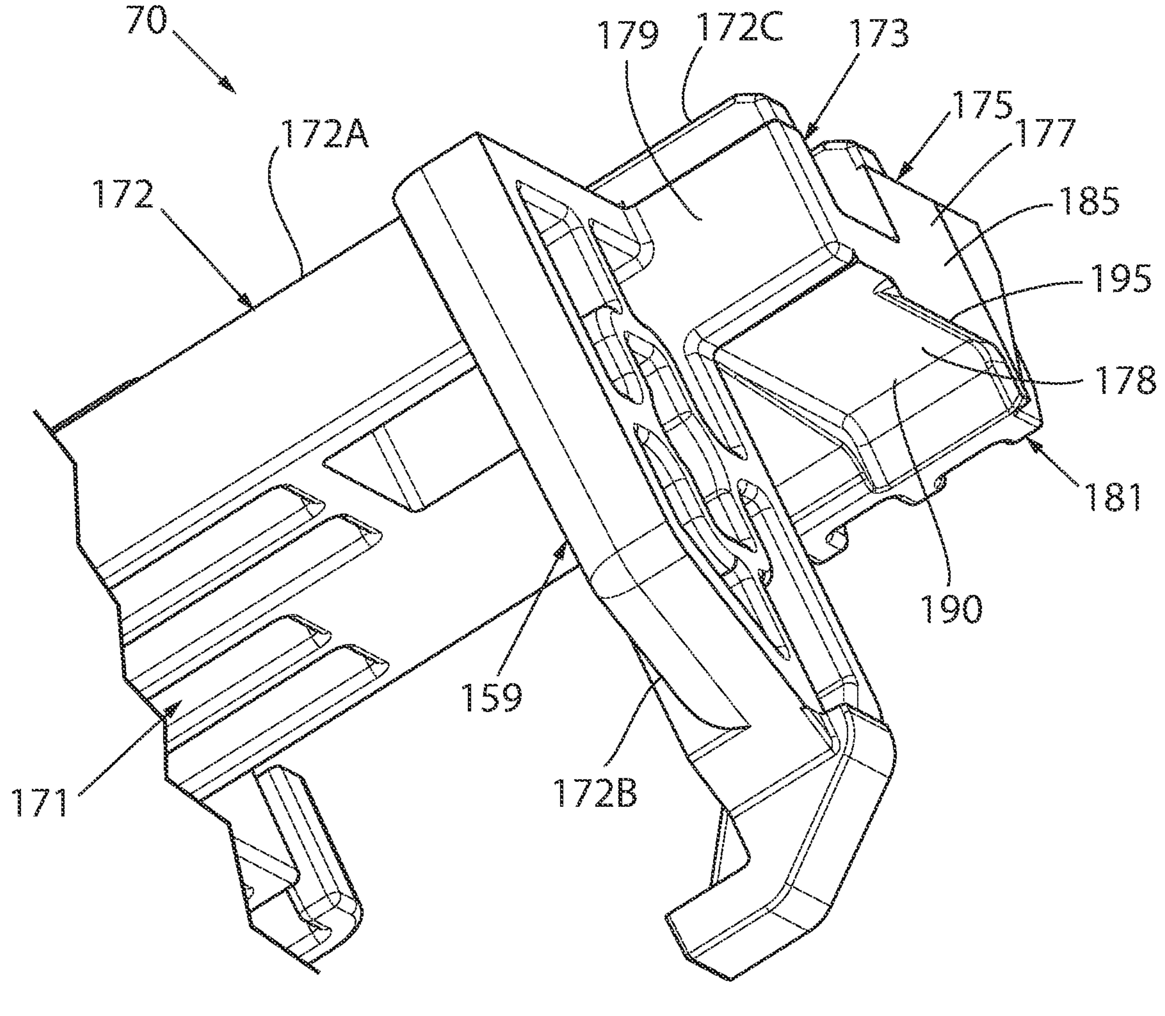
FIG. 10 is a partial perspective view of the plunger of FIGS. 8 and 9.

As shown in FIGS. 8-10, in one aspect of the invention, the plunger 70 includes a first plunger face 135 and a second plunger face 140 located opposite from each other. The plunger 70 further includes a first plunger end 145 and a second plunger end 150, located opposite from the first plunger end 145, as well as a first plunger side 155 and a second plunger side 160 also located opposite from each other. An outer periphery, also referred to herein as a plunger sidewall 165, is defined by the first plunger end 145, which meets the first plunger side 155, which, in turn, meets the second plunger end 150, and which, in turn meets the second plunger side 160 moving around the plunger. The plunger sidewall 165 extends generally perpendicular between both the first plunger face 135 and the second plunger face 140.

As illustrated, the plunger 70 further includes three plunger arms 170, with each plunger arm 170 generally being a Z-like member. More specifically, each plunger arm 170 may have three regions, a first plunger arm region 170A, a second plunger arm region 170B, and a third plunger arm region 170C. The first plunger arm region 170A projects away from the first plunger sidewall 165 at the plunger side 155 before extending into the second plunger arm region 170B. The second plunger arm region 170B projects away from the second plunger face 140 and generally perpendicular to the first plunger arm region 170A. The plunger arm 170 then continues to extend, where the third plunger arm 170C projects generally perpendicular to the second plunger arm region 170B, away from the first plunger side 155. The plunger arm regions 170B is therefore located between the first and third plunger arm regions 170A and 170C, creating an offset between the first and third plunger arm regions. The first and third plunger arm regions 170A and 170C extend generally parallel to but in different axes from one another to form the Z-like member. Each arm 170 preferably engages a switching element 45, thereby causing movable contacts 65 to selectively separate from or connect with the fixed contacts 67 to enable or disable an electrical current. In other embodiments, the plunger 70 may include a greater or lesser number of arms.

The plunger 70 further includes a plunger member 172. The plunger member 172 extends between a first end 171 and a second end 173 and includes a first plunger member region 172A, a second plunger member region 172B, and a third plunger member region 172C. In one embodiment, the first plunger member region 172A begins at the first end 171 of the plunger member 172 and projects away from the second plunger side 160 in the direction opposite from the first plunger arm region 170A, the first plunger member region 172A extends to the second plunger member region 172B, which is closer to the second end 173 than the first end 171 of the plunger member 172. The second plunger member 172B has a width less than the width of the first plunger member 172A and extends in a generally orthogonal direction to the first plunger member region 172A along a portion the end of the first plunger member region 172A that is distal from the second plunger side 160. The third plunger member region 172C also has a width less than the width of the first plunger member 172A and is positioned adjacent to the second plunger member 172 along the end of the first plunger member region 172A that is distal from the second plunger side 160. The third plunger member region 172C extends from the first plunger member region 172A in a direction that is generally coplanar to the first plunger member 172A. The third plunger member regions 172 will also be referred to herein as the plunger engagement section 175.

In one embodiment, the plunger engagement section 175 extends from a first surface 176 to a second surface 177, the second surface located opposite the first surface 176. The first surface 176 may, in part, be integrally molded with the first plunger member region 172A, and the second surface 177 defines the second end 173 of the plunger member 172. The plunger engagement section 175 is additionally L-shaped extending between a first end 179 and a second end 181. The first end 179 of the plunger engagement section 175 defines the top of the L-shape, and the second end 181 of the plunger engagement section 175 defines the long portion of the L-shape. The long portion of the L-shape is oriented transverse to the direction of rotation of the actuator and is configured to prevent rotation of the actuator 20 when the contacts are welded. The short portion of the L-shape extends generally orthogonal to the long portion and tangential to the direction of rotation of the actuator. The short portion of the L-shape is configured to extend towards the direction of the ON position such that the actuator engagement section 85 rotates within the long and short portions of the L-shape as it is rotated from the ON position to the OFF position. The short portion of the L-shape is configured to prevent the actuator 20 from sliding laterally around the plunger 70. The plunger engagement section 175 may also include a plunger engagement sidewall 178 extending downwards from the second surface 177. The plunger engagement sidewall 178 forms an indention or engagement area 190 located between the second surface 177 of the plunger engagement section 175 and the first plunger member region 172A. The plunger engagement section 175 further includes a crossbar 195 located adjacent to the edge of the second surface 177 of the plunger engagement section 175 and protruding from the plunger engagement sidewall 178. The crossbar 195 may be shaped like a triangle, blade, or other angled protrusion so that a base of the crossbar 195 is located adjacent to the plunger engagement sidewall 178 and narrows into a point when viewed cross sectionally.

A least a portion of the plunger engagement section 175, and preferably the crossbar 195, may be formed from a second material. The second material may be polyether ether ketone (PEEK) and reinforced with carbon fiber, glass reinforced polyphenylene sulfide (PPS GF), polyamides with glass particles or nylon with glass fiber (PA GF), or any other material of sufficient hardness, as will be explained hereinafter. Typically, the entire plunger 70 will be formed as a single element and made from a common material.

Figure 11:
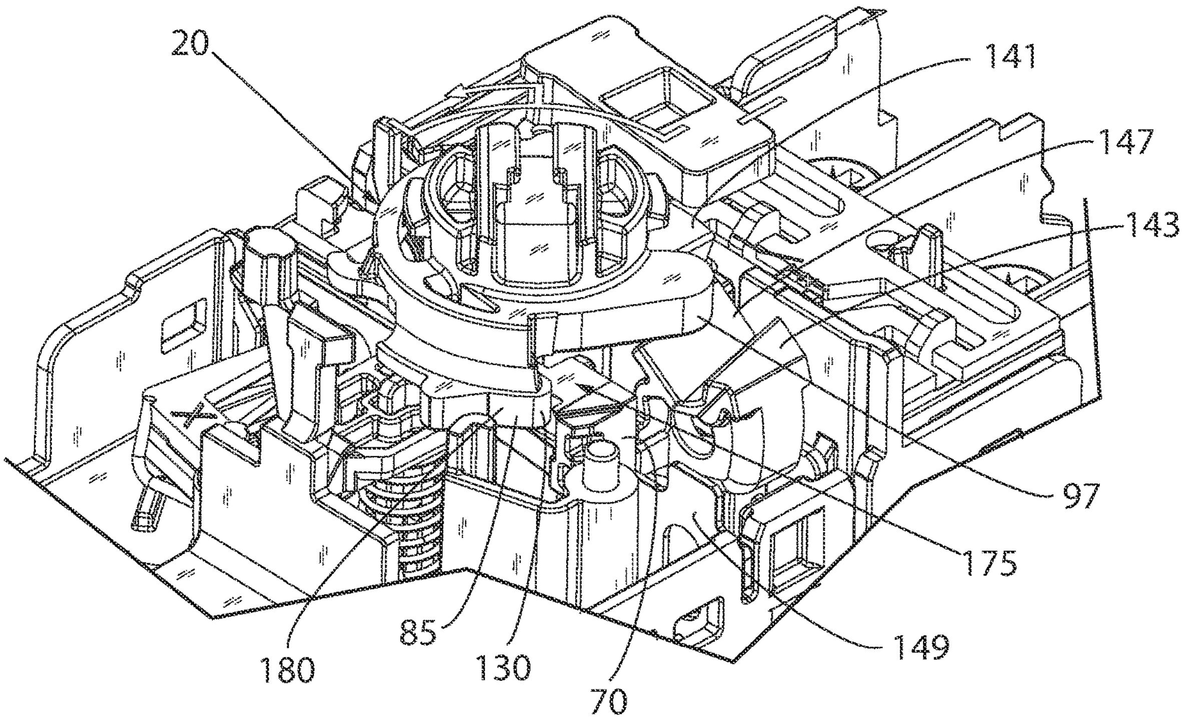
FIG. 11 is a right perspective view of the actuator of FIG. 6 and the plunger of FIGS. 8-10.
Figure 12:
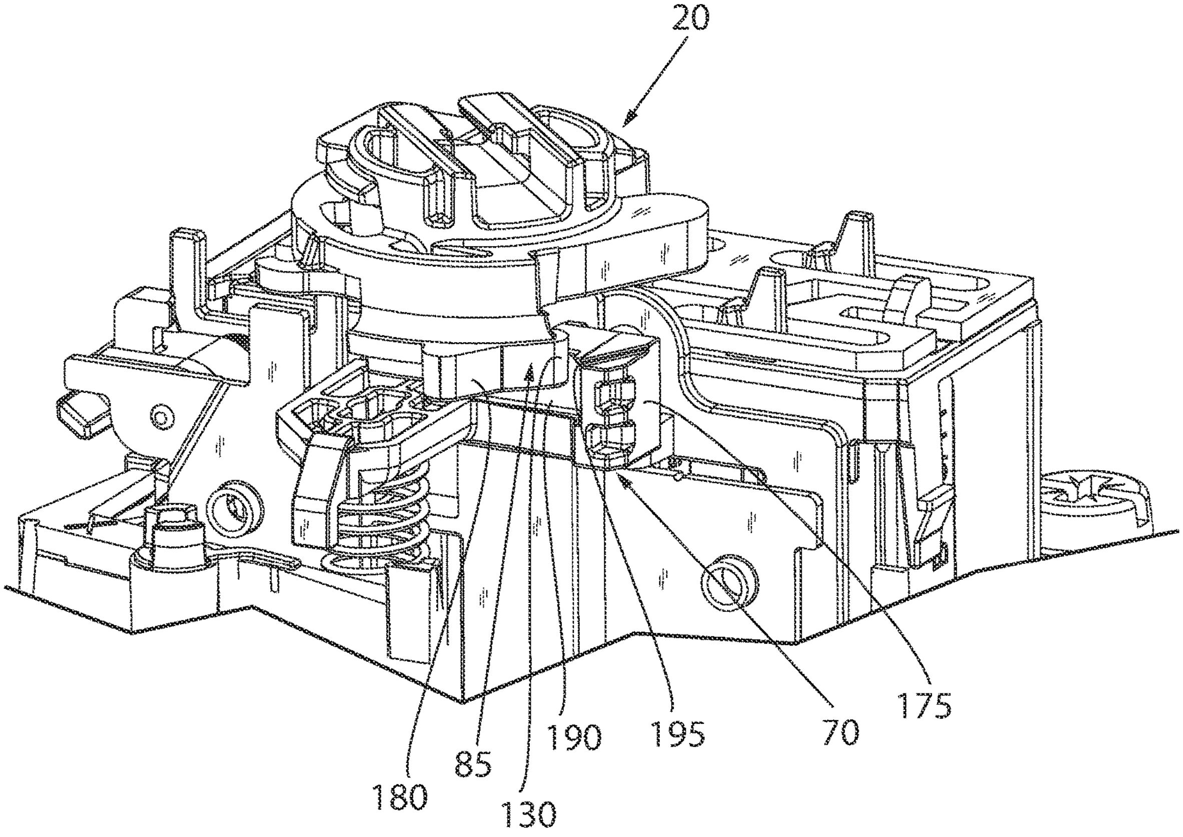
FIG. 12 is a left perspective view of the actuator and the plunger of FIG. 11.
Figure 13:
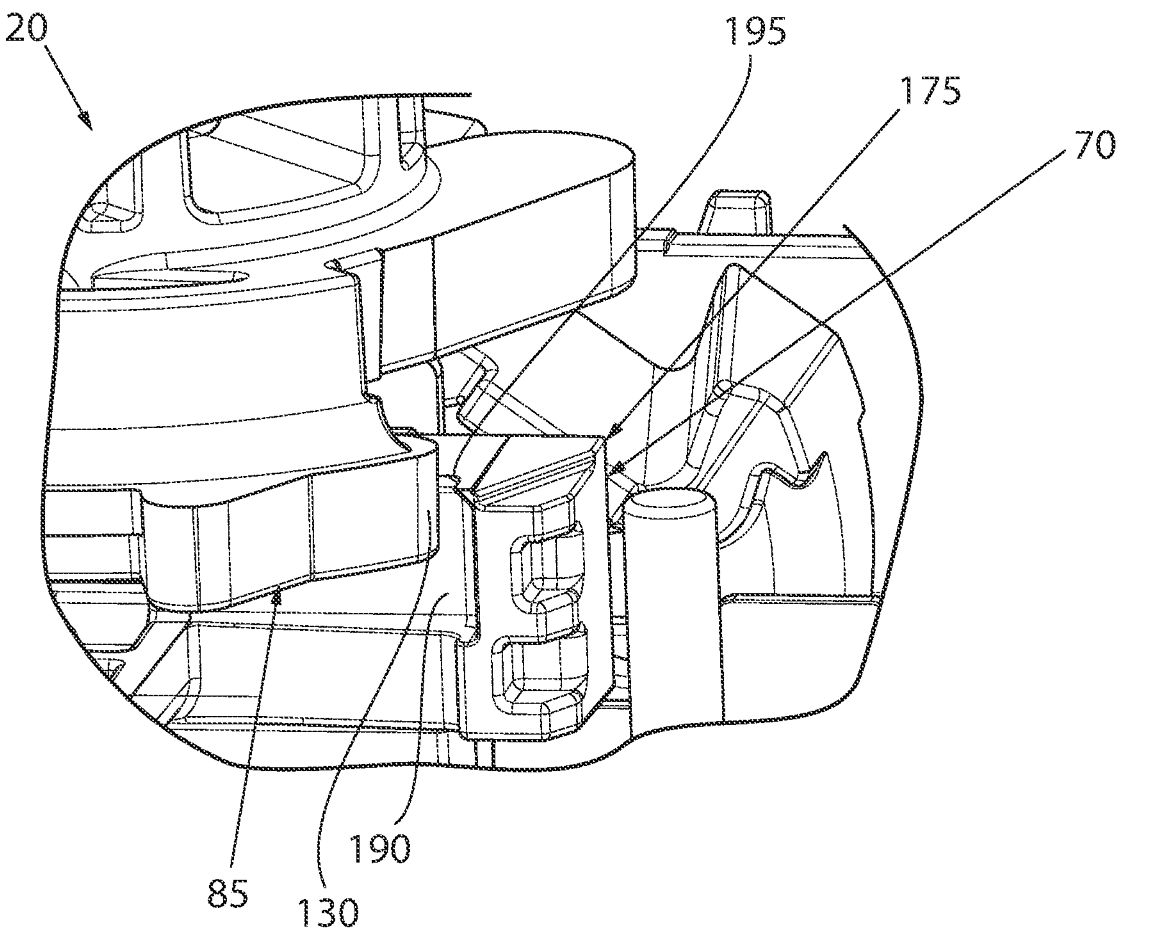
FIG. 13 is an elevation view of the actuator and the plunger of FIGS. 11 and 12.

Referring to FIGS. 11-13, the plunger engagement section 175 selectively engages with the actuator engagement section 85 when at least one set of the mobile contacts 65 are welded to the stationary contacts 67 and an attempt is made to rotate the actuator 20. In more detail, as the actuator 20 is partially turned from the ON state and the actuator engagement section 85 rotates into the engagement area 190 of the plunger engagement section 175 until the actuator engagement surface 134 contacts the crossbar 195 of the plunger 70. The L-shaped engagement area 190 of the plunger 70 prevents the actuator 20 from slipping besides the plunger 70, while the crossbar 195 prevents the actuator 20 from slipping over the plunger 70. The harder material of the crossbar 195 is configured to cause the crossbar 195 to interlock with the softer material of the actuator engagement surface 130. The crossbar 195 is able to "bite", or compress, into the softer material of the actuator engagement surface 130 as the plunger 70 and actuator 20 are forced against each other. The difference in the material hardness of the crossbar 195 and actuator engagement section 85 preferably ensures that the crossbar 195 is recessed into the actuator engagement surface 130 when engaged, thereby preventing the actuator 20 from sliding over the plunger 70. Because the plunger engagement section 175 prevents the actuator engagement section 85 from sliding either to the side or over the top of the plunger 70 when the actuator is turned and the contacts are welded, a technician is made aware that the contacts 65, 67 are, in fact, welded together. If a technician applies increased force to attempt to open the switch 5, a component will break or snap before the actuator 20 is forced into an "off position." The user is preferably able to hear a part breaking and feel the difference before and after either or both the actuator 20 or plunger 70 breaks, alerting the technician to a failure of the switch 5.

Figure 14A:
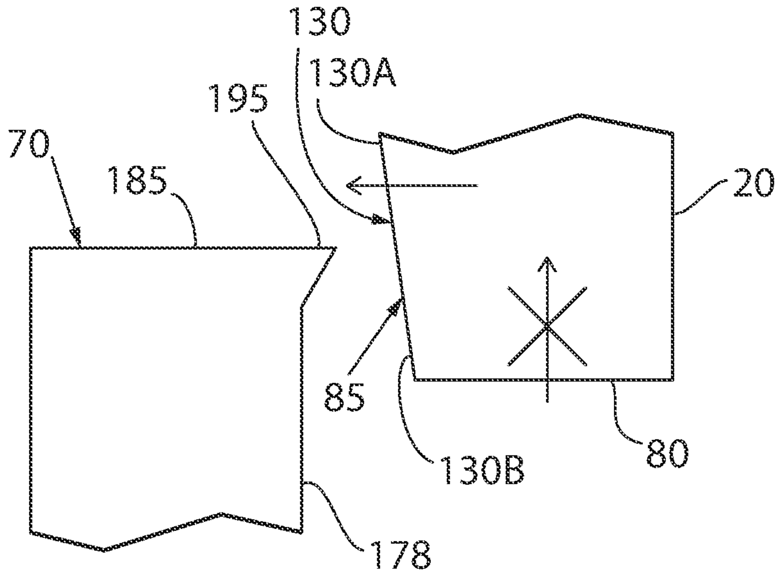
FIG. 14A is a partial sectional view of another embodiment of the actuator and plunger.
Figure 14B:
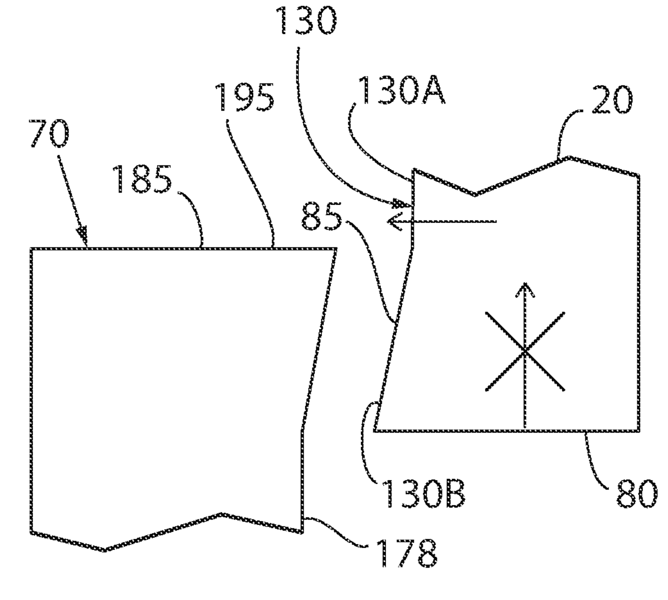
FIG. 14B is a partial sectional view of yet another embodiment of the actuator and plunger.

While FIGS. 10-12 illustrate one embodiment of the invention, the actuator engagement section 85, or actuator engagement surface 130, and crossbar 195 may be shaped differently as long as the design allows the necessary torque so that the actuator 20 and plunger 70 are able to interlock. For example, as shown in FIGS. 14A and 14B, two additional embodiments of the actuator 20 and plunger 70 are illustrated. As illustrated in FIG. 14A, the plunger 70 includes a crossbar 195 with an angled protrusion, while the actuator engagement surface 130 may be slightly slanted such that an upper portion 130A of the actuator engagement surface 130, or region closer to the actuator shoulder section 90, is located closer to the plunger engagement sidewall 178 then a lower portion 130B of the actuator engagement surface 130. Turning to FIG. 14B, the actuator engagement surface 130 may further be slanted or angled in such a way that the portion of the actuator 20 at the second actuator face 80 protrudes furthest toward the plunger and the actuator engagement surface 130 tapers inward as it extends away from the second actuator face 80. The plunger engagement sidewall 178 may have a complementary slope such that a space between the actuator engagement surface 130 and the plunger engagement sidewall 178 remains generally constant. Thus, while the plunger 70 may not bite as far into the actuator 20, the plunger engagement sidewall 178 more fully engages the actuator engagement surface 130 preventing the actuator 20 from sliding upward and over the plunger 70 if the contacts are welded when the actuator 20 is rotated.

Moreover, while the examples illustrated in FIG. 14 show that the plunger 70 includes a plunger 195 at the top of the plunger engagement sidewall 178 and the sectional area of the plunger 195 is illustrated as an angled, or triangular, protrusion, the crossbar 195 may be any shape and size as long as it either bites into the actuator engagement surface 130 or engages a complementary shaped actuator engagement surface 130 in such a manner that the actuator 20 is not pushed upwards when additional torque is applied to the actuator 20.

Figure 15:
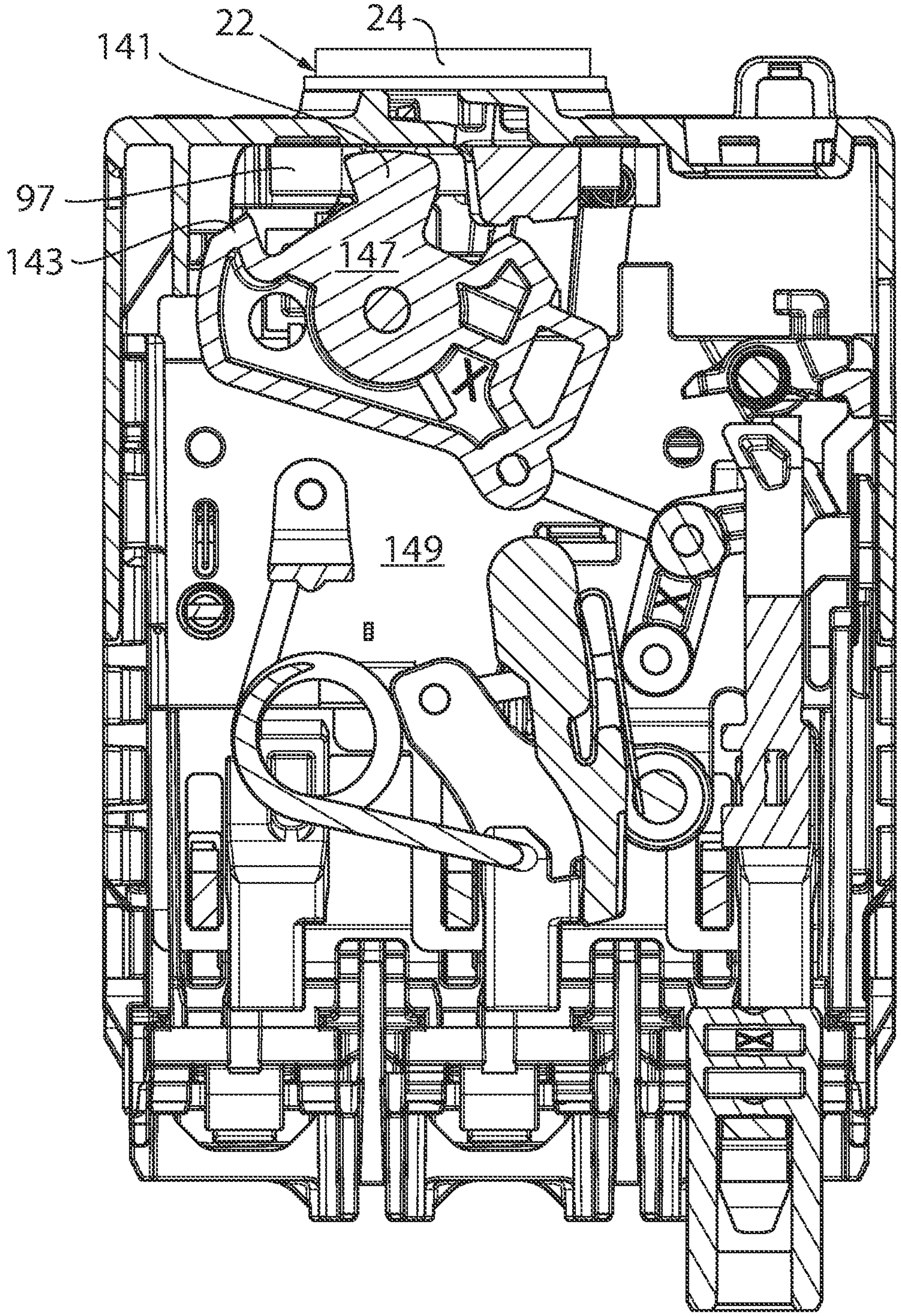
FIG. 15 is a partial section view of the actuator and an internal mechanism to move the plunger with the switching device.
Figure 16:
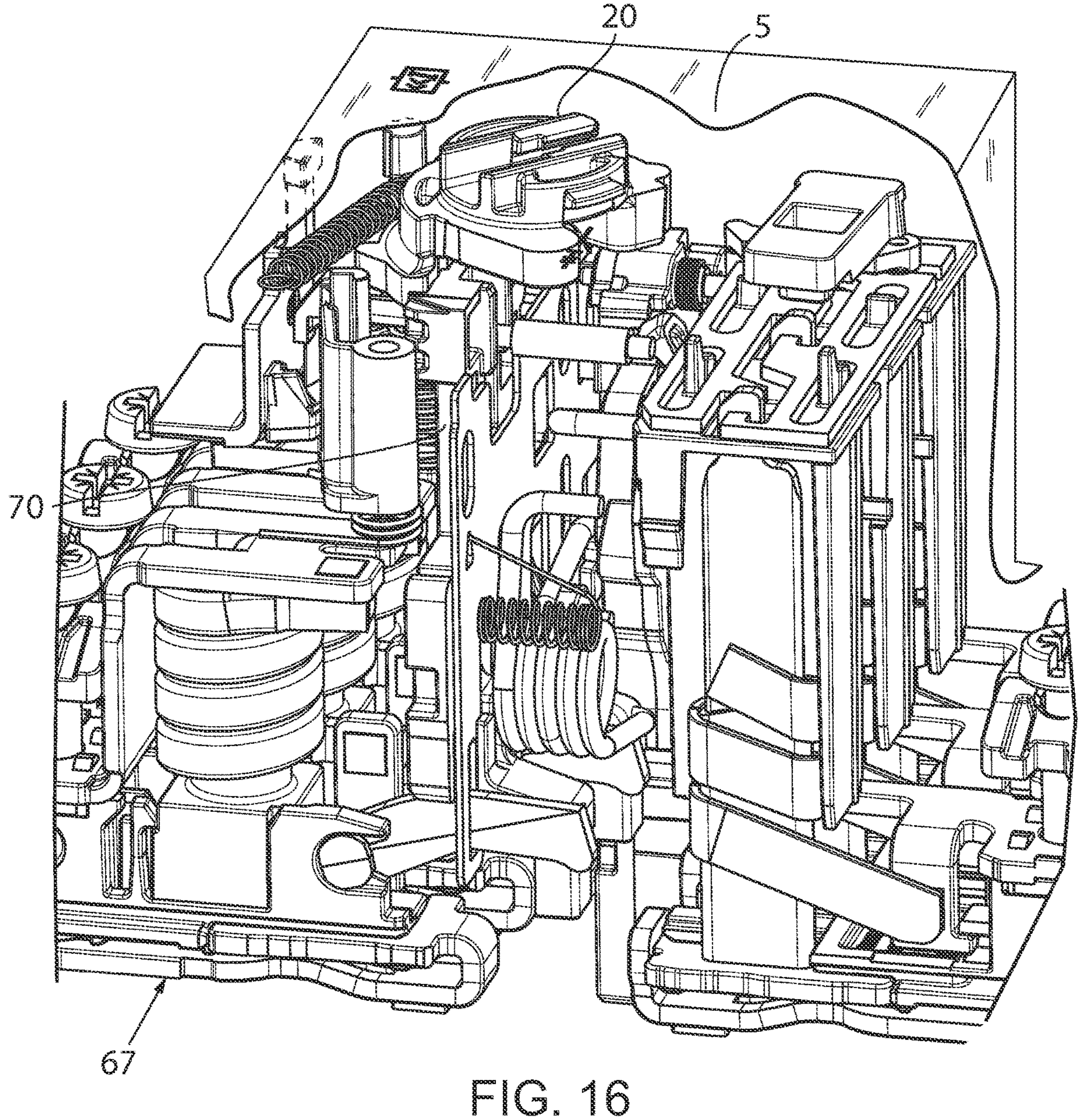
FIG. 16 is a partial perspective view of the actuator of FIG. 6 and the plunger of FIG. 9 incorporated in a switching device.

In operation, the actuator handle 22 is rotated by a technician to selectively move the switch 5 between the first or "ON" state and the second or "OFF" state. As further illustrated in FIG. 15, when the contacts 65, 67 are free to move, rotation of the switch 5 in a first direction causes the cam 97 on the actuator 90 to engage the first gear tooth 141 on the internal actuator 147 pushing the plate 149 and, in turn, the plunger downwards to separate the moving contact 65 from the fixed contact 67. Rotation of the switch in the opposite direction, causes the cam 97 on the actuator 90 to engage the second gear tooth 143 on the internal actuator, drawing the plate 149 and, in turn, the plunger upwards to close the moving contact 65 with the fixed contact 67. In the "ON" state, the contacts 65, 67 are closed, forming an electrical connection. In the "OFF" state, the contacts 65, 67 the contacts are open, preventing current flow through the switch 5.

If however, the contacts 65, 67 are welded together, rotation of the actuator 20 attempts to push the plate 149 and, in turn, the plunger 70 downwards, but the welded contacts prevent motion of the plunger. The actuator 20 and the plunger 70, therefore, engage each other. The actuator engagement section 85 rotates towards the plunger engagement section 175 until the actuator engagement surface 130 is located within the engagement area 190 and abuts the crossbar 195. If the actuator 20 continues to be rotate without the plunger 70 lowering, the torque applied to the actuator 20 causes the actuator engagement surface 130 to interlock with the crossbar 195. The harder material of the crossbar 195 engages the softer material of the actuator engagement surface 130, thereby preventing upward motion of the actuator 20 and preventing the actuator 20 from slipping over the top edge of the plunger 70. The actuator engagement section 85 is also located within the L-shaped engagement area 190 on the plunger, thereby preventing sideways motion of the actuator 20 and preventing the actuator 20 from slipping past the side of the plunger 70. Because the actuator 20 is engaging the plunger 70, if a technician applies further force in an attempt to rotate the actuator 20, then either or both the actuator 20 and plunger 70 will break. The mechanism, therefore, does not allow the actuator 20 to be rotated to an "off" position when the contacts are welded together. When one, or both, the actuator 20 and plunger 70 breaks, the user preferably can hear the sound of the breaking components and feel the abrupt difference in resistance within the switch 5 as the actuator completes its rotation to the off position. The noise and tactile feedback provide an indication to the technician that the contacts are welded and, further, that either the actuator 20 or plunger 70 are now broken and the switch 5 needs repair or replacement.

The novel structure of the actuator 20 and plunger 70 therefore allow users to quickly and safely determine whether contacts 65 have been opened under normal operation (i.e., an electrical connection has been successfully broken) without installing additional components or requiring additional expenses. The structure similarly either prevents rotation of the handle 22 to an OFF position or alerts the technician via the noise and tactile feedback of an internal component failure if the contacts are welded.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A switching device for industrial equipment having at least one pair of contacts, the switching device comprising:

an actuator having an actuator engagement section, wherein the actuator is selectively rotated around an axis of rotation between a first position and a second position; and a plunger configured to move reciprocally along a plunger axis between a first position and a second position, wherein the plunger axis is parallel to the axis of rotation around which the actuator rotates, the plunger having:

a first end with an L-shaped engagement area configured to engage the actuator engagement section, and a second end with at least one movable switching element mounted on the second end of the plunger, wherein the L-shaped engagement area includes:

a first portion oriented transverse to a direction of rotation of the actuator, a second portion oriented generally orthogonal to the first portion and tangential to the direction of rotation of the actuator, and a crossbar protruding from the first portion and the second portion, wherein the crossbar protrudes from the first portion toward the actuator engagement section when the actuator is in the first position;

wherein when the at least one pair of contacts are not welded together, the actuator selectively moves the plunger along the plunger axis as the actuator is rotated between the first position and the second position, thereby moving the crossbar out of position to engage the actuator engagement section; and wherein when the at least one pair of contacts are welded together, the welded contacts prevent the plunger from moving along the plunger axis due to rotation of the actuator and the actuator engagement section engages the crossbar on the L-shaped engagement area of the plunger thereby preventing the actuator from rotating between the first position and the second position.

2. The switching device of claim 1 wherein the actuator further includes a cam configured to engage an internal drive member, wherein:

the internal drive member is selectively moved between a first position and a second position by the cam as the actuator is selectively moved, and the internal drive member is coupled to the plunger to selectively move the plunger along the plunger axis between the first position and the second position as the internal drive member is selectively moved.

3. The switching device of claim 1, wherein the crossbar is configured to compress into a surface of the actuator engagement section when the contacts are welded and the actuator is moved from an "ON" position to an "OFF" position.

4. The switching device of claim 1 wherein at least a portion of the plunger or at least a portion of the actuator breaks when the at least one pair of contacts are welded together and the actuator is moved between the first position and the second position.

5. The switching device of claim 4 wherein breaking either the actuator or plunger provides at least one of a tactile and an audible alert that the contacts are welded.

6. The switching device of claim 1 wherein the actuator engagement section is formed from a first material and the plunger engagement section is formed from a second material, wherein the second material is harder than the first material.

7. The switching device of claim 6 wherein the first material is selected from at least one of nylon, polyoxymethylene, and polybutylene terephthalate.

8. The switching device of claim 6 wherein the second material is selected from one of polyether ether ketone reinforced with carbon fiber, glass reinforced polyphenylene sulfide, polyamides with glass particles, and nylon with glass fiber.

* * * * *